Fig. 1^A.

INVENTORS
GEORGE A. PERLEY
JAMES B. GODSHALK
ATTORNEY.

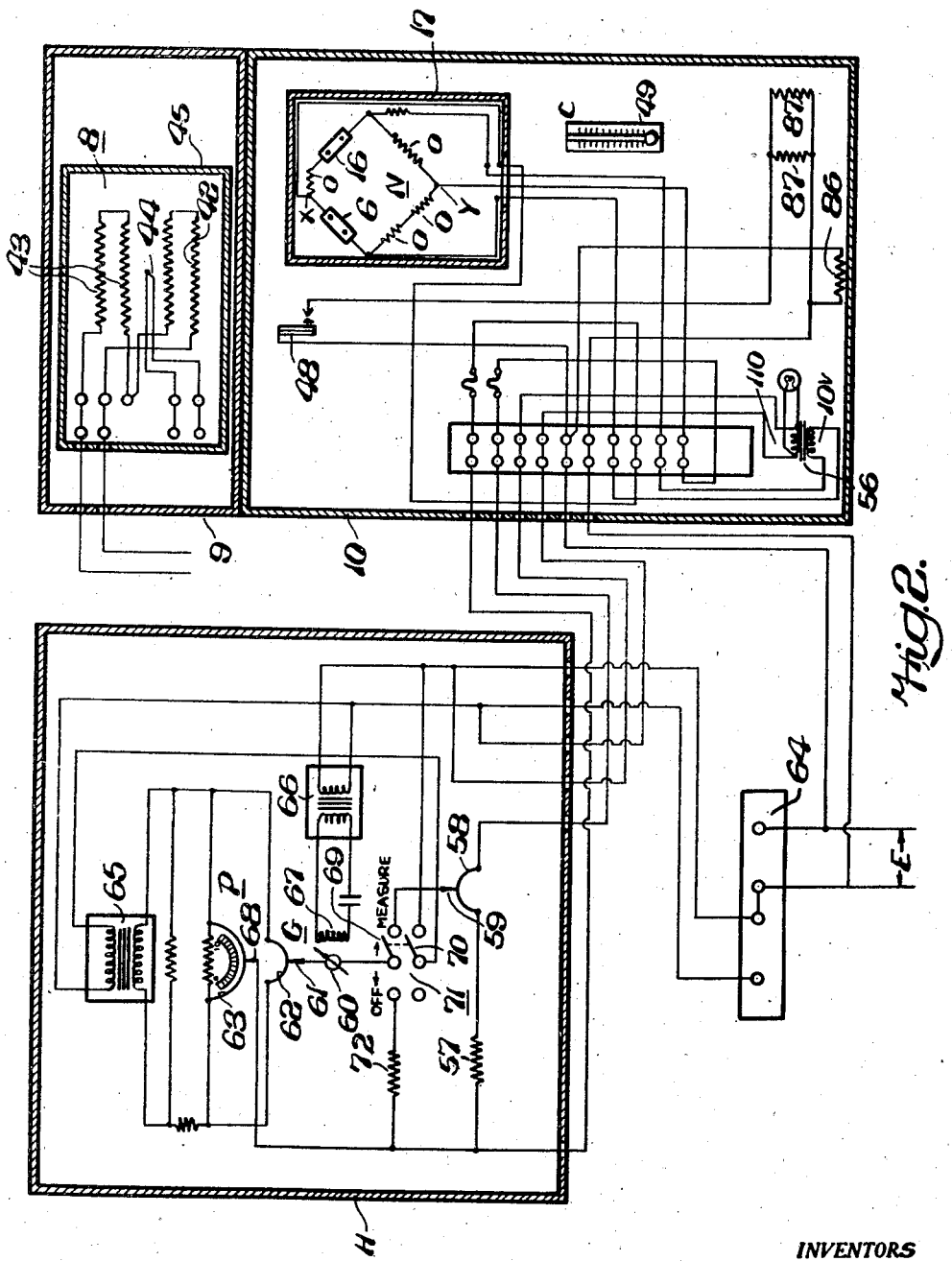

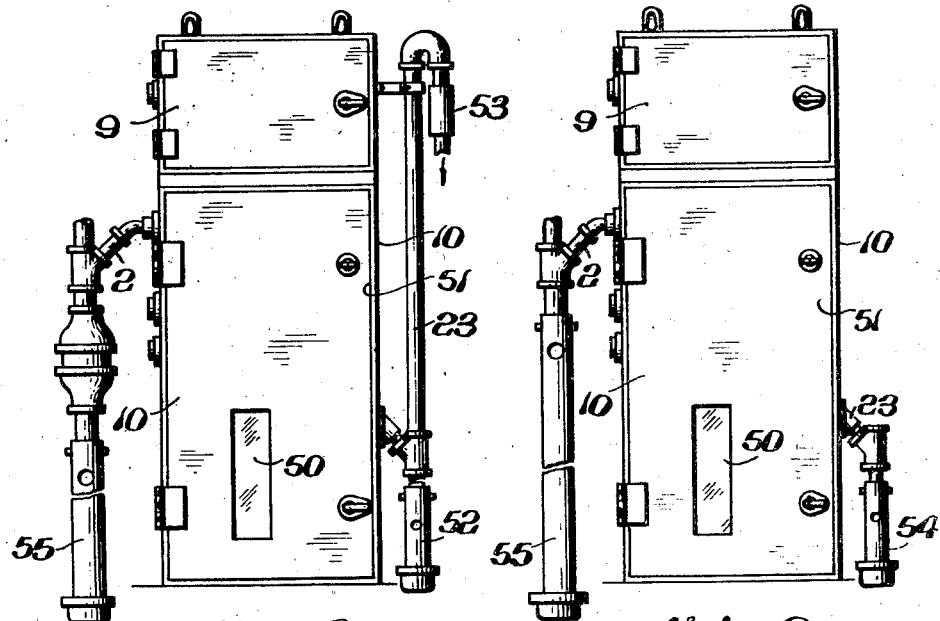
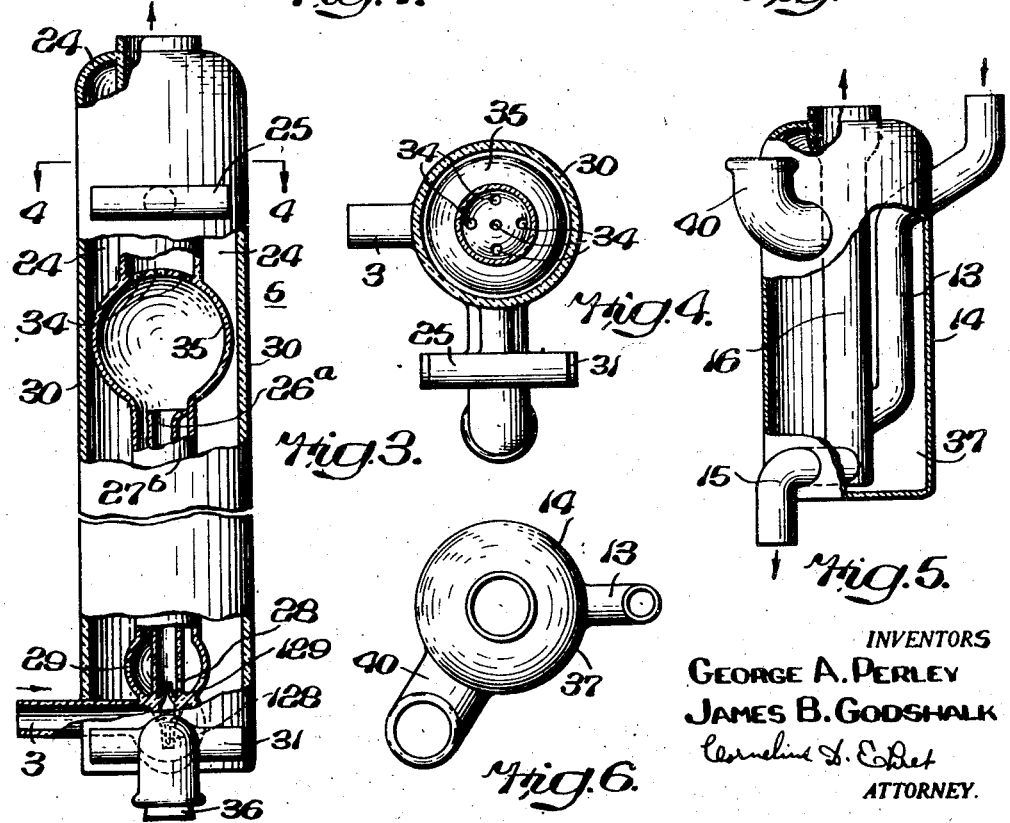

Patented June 10, 1947

2,422,129

UNITED STATES PATENT OFFICE 2,422,129

MEASUREMENT OF OXYGEN IN GAS MIXTURES

George A. Perley, Wyncote, and James B. Godshalk, Philadelphia, Pa., assignors to Leeds and Northrup Company, Philadelphia, Pa., a corporation of Pennsylvania Application February 19, 1942, Serial No. 431,466

7 Claims. (Cl. 23—232)

Our invention relates to gas analysis and more particularly to systems for determining the oxygen content of gas mixtures, such, particularly, as those of metallurgical furnaces, boiler furnaces, cement kilns, oil refining apparatus, and the like, all for brevity herein termed "sample gas."

In accordance with one aspect of our invention, a stream of the sample gas, after addition thereto of an excess of hydrogen, or equivalent combustible gas or vapor such as ammonia, is passed through a combustion chamber of quartz, "Vycor" glass, Alundum or equivalent non-catalytic refractory material, selectively to effect combination of hydrogen with the free oxygen of the sample gas to the substantial exclusion of reaction of the oxygen, of the hydrogen, or of both of them, with one or more other constituents, such as carbon monoxide, carbon dioxide, methane, sulphur dioxide, of the sample gas; by measurement of the change in the thermal conductivity of the hydrogen-sample gas mixture due to its passage through said combustion chamber, there is determined the percentage of free oxygen in the stream of sample gas before aforesaid addition of hydrogen or equivalent.

Further in accordance with our invention, the addition of hydrogen, ammonia, or equivalent is controlled to maintain constant, in the stream of hydrogen-sample gas mixture, the ratio of hydrogen to sample gas; more particularly, the hydrogen and sample gas flow to a common mixing line or chamber through tubes, preferably capillary, of prescribed or predetermined diameters and lengths, across each of which the pressure drop is maintained constant, or substantially so within limits suited to the desired accuracy, as by pressure-release devices comprising, preferably, liquid columns associated with constant pressure head device or devices.

Our invention further resides in the methods and apparatus hereinafter described and claimed.

For an understanding of our invention and for illustration of a system embodying it, reference is made to the accompanying drawings, in which:

Fig. 1 is a front elevational view, some parts in section and some parts broken away, of the flow system, and associated equipment, of a gas-analysis apparatus.

Fig. 1A schematically illustrates a modification of the system of Fig. 1.

Fig. 2 is a wiring diagram of the electrical components of a gas-analysis system including the apparatus of Fig. 1 and complemental measuring apparatus.

Fig. 3, on enlarged scale and in part broken away, is an elevational view of the saturator appearing in Fig. 1.

Fig. 4 is in part a section taken on line 4—4 of Fig. 3.

Fig. 5 on enlarged scale and in part broken away, is an elevational view of the condenser appearing in Fig. 1.

Fig. 6 is a plan view of Fig. 5.

Figs. 7 and 8 are front elevational views of the apparatus of Fig. 1, cabinet doors closed, with addition of traps and connections to adapt the apparatus for vacuum and pressure applications respectively.

Figure 1:
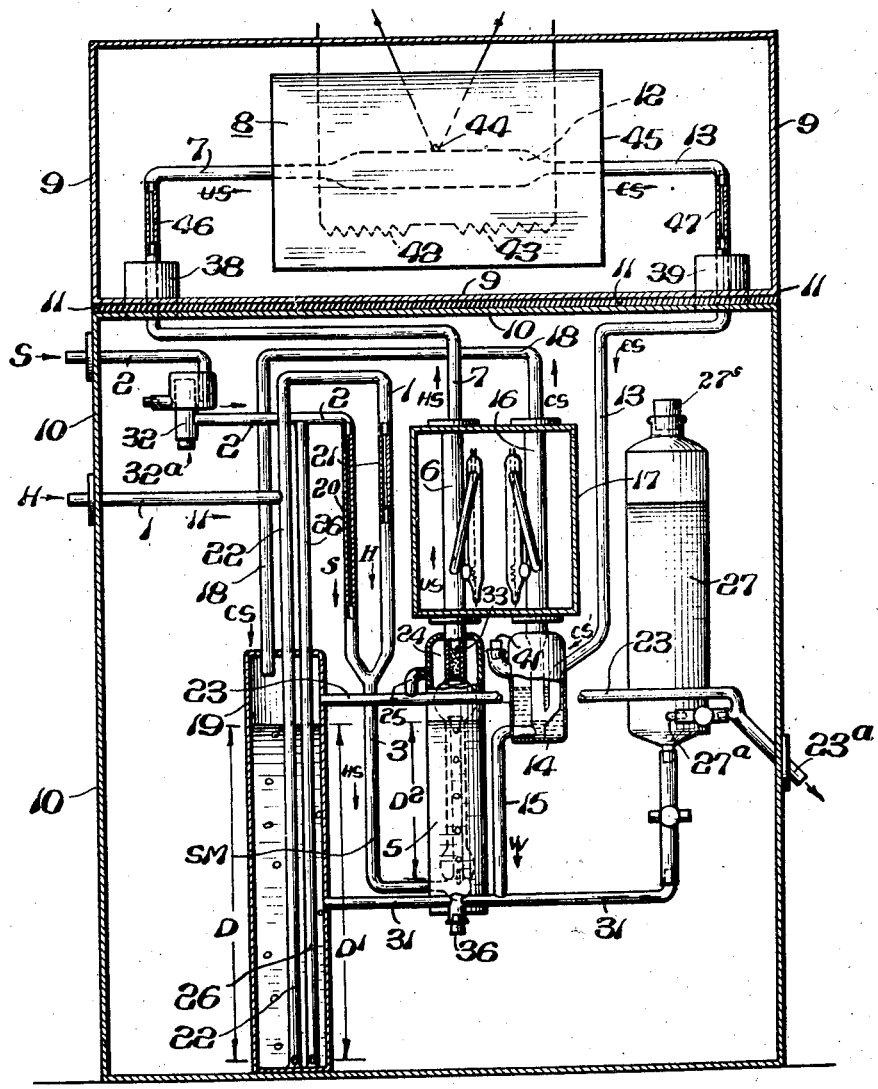
Figure 1:
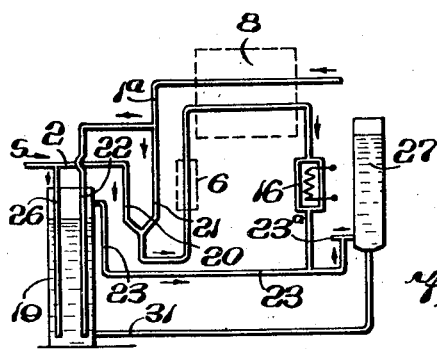

Referring to Fig. 1 as exemplary of gas-analyzing apparatus embodying our invention, streams of hydrogen H (or other vapor or gas, combustible by or combinable with the oxygen or other selected component of the sample gas, equivalent to hydrogen more particularly in the sense of high affinity for the oxygen and in the sense of having thermal conductivity substantially different from that of oxygen, for example, cracked ammonia methane, or natural gas) and flue gas S, or other sample gas to be analyzed, flow respectively through the pipes 1 and 2 which merge into or are connected with a common pipe 3 in which the two streams are mixed. The mixture HS, of hydrogen and sample gas, after passage through device 5, in which it is saturated with water vapor, flows as stream US through a thermal conductivity cell 6, which may be of type disclosed in United States Letters Patent Nos. 1,504,707 or 2,045,640, thence through pipe 7, to a furnace 8 disposed within housing 9 suitably thermally insulated from housing 10 by the layer 11 of material, for example asbestos, of suitably high thermal resistance.

It is important that the walls of the reaction or combustion tube 12, located in furnace 8, with which the aforesaid gases are in contact during their combustion should be of material such as quartz, "Vycor" glass, Alundum or other suitable refractory material, which is substantially non-catalytic to undesired reactions; more particularly tube 12 should not be of or contain within it a metal or alloy, such as platinum, iron, nickel, nickel-chrome, or the like, which promotes reaction of oxygen with either carbon monoxide, sulphur dioxide, or methane or which promotes reaction of hydrogen with carbon dioxide or sulfur dioxide or any one or more of such impurities commonly present in flue gas and other sampled gases.

The combusted mixture CS, comprising the gaseous products of the combustion reaction and also water vapor, produced by combustion of the hydrogen added to the stream of sample gas with the free oxygen of that stream, flows through the pipe 13 to a condenser 14, or equivalent, in the lower housing 10. The condensate, excess water content of the combusted mixture, flows from condenser 14 into pipe 15 for discharge to waste, or preferably, as hereinafter described, to a liquid-pressure system which maintains constant the liquid level in chambers 5 and 19, a relationship necessary for constancy of the ratio of hydrogen to sample gas in the stream which passes through saturator 5 to the furnace 8.

The combusted gases, now freed of their excess moisture but saturated with water vapor, pass from the condenser 14 through the second thermal conductivity cell 16, similar to cell 6, and preferably enclosed with it in the common housing 17 which serves to equalize the ambient temperature surrounding the two cells 16 and 6 so as to reduce temperature errors. The gases leaving the second cell 16 flow through pipe 18 to waste, or preferably through chamber 19, one of the components of our arrangement for maintaining constant the ratio of hydrogen to sample gas.

The two thermal conductivity cells 6 and 16 include resistance forming arms of a Wheatstone bridge network N, Fig. 2, whose balance point depends upon the ratio to each other of the thermal conductivities of the uncombusted and combusted gas mixtures, both saturated with water vapor at predetermined temperature.

Because these thermal conductivities are largely affected by the relative amount of hydrogen in the mixture and because the difference in hydrogen before and after combustion is a measurement of the amount of hydrogen in the sample gas, the measured change in thermal conductivity is a measure of the amount of oxygen. The following diagram discloses the reactions involved

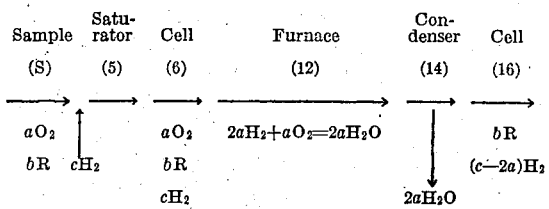

where $a$, $b$ and $c$ are relative amounts of oxygen, a gas or gases R, and hydrogen respectively; R may be or comprise any one or more of the gases carbon dioxide, methane, sulfur dioxide, nitrogen; $c$ is not less than $2a$.

As shown by the above diagram, the effect measured by the thermal-conductivity bridge N is the disappearance of "$2a$" volumes of hydrogen; the volume "$b$" of gas or gases R goes through both thermal conductivity cells unchanged in magnitude, as does also the excess hydrogen. If "R" were allowed because of catalytic action to react with the oxygen, or the hydrogen, or both, there would be substantial and indeterminate error in the measurement. Because of the reduction of volume incident to combustion, the percentage of all constituents is proportionally greater in thermal conductivity cell 16 but this is taken into account in the calibration of the measuring apparatus whose scale or chart may, assuming the ratio of hydrogen to sample gas is maintained constant, be marked for direct reading of percentage of free oxygen in the sample stream S.

The joint response of cells 6 and 16 is very sensitive to changes in the percentage of hydrogen added to the stream S because an increase, for example, of hydrogen dilutes the mixture of sample and hydrogen gases and so reduces the percentage of free oxygen in the mixture. It is, therefore, necessary for precise determination of free oxygen in the sample gas that the addition of hydrogen thereto be strictly regulated or controlled.

In our preferred arrangement for maintaining substantially constant the ratio of hydrogen to sample gas, there are provided the capillary tubes 21 and 20, included in the supply lines 1 and 2 for the hydrogen and sample gas respectively, and the drops in pressure across these capillary tubes are maintained equal to the same fixed magnitude or to suitably different fixed magnitudes.

More specifically, pipe 1, on the up-stream side of the capillary 21 is provided with a branch or tap 22 having an opening suitably below the level of liquid within chamber 19 closed at its upper end and into which, above the level of the liquid, there flows through pipe 18 the combusted gases from cell 16. The exhaust or waste pipe 23 extending from chamber 19 above the surface of the liquid extends outside of housing 10 where it may be connected to a source of pressure equal to, above, or below atmospheric pressure, depending upon the system from which the stream of sample gas S is withdrawn.

It will therefore be understood that hydrogen bubbles upwardly in chamber 19 from pipe 22 at whatever rate is required to maintain constant flow of hydrogen through pipe 1 at a rate which is a function of the distance D from the surface of the liquid in regulator 19 to the level of the opening in pipe 22; in other words, the difference between pressure P1 on the upstream side of capillary 21 and the pressure P2 in chamber 19 above the liquid is maintained equal to the pressure due to the aforesaid liquid head D.

Similarly to regulate the pressure effecting flow of sample gas through capillary 20, the bleeder pipe 26 is connected to pipe 2 on the up-stream side of the capillary 20 and extends therefrom to below the level of liquid in chamber 19, or similar bubbler chamber connected thereto. Accordingly the pressure P4 on the up-stream side of the capillary 20 is maintained at constant magnitude determined by the height D1 of liquid from the surface of liquid in 19 to the opening in pipe 26. As pressure P4 tends to rise, more and more of the sample gas is diverted from pipe 1 and bubbles from pipe 26 through chamber 19 and thence to waste through pipe 23.

Beyond the capillary tubes 20 and 21, the two streams merge in a common pipe 3 connected to the bottom of saturator 5 which, Fig. 3, comprises three concentric tubes 26A, 27B and 30. The innermost tube 26A and intermediate tube 27B are joined at the lower ends, the orifice 28 providing communication between them. The intermediate tube 27B and outer tube 30 are joined at their lower ends, the orifice 29 providing communication between them. The inlet pipe 3 of the saturator communicates with inner tube 26A through the pair of orifices 128, 129.

The liquid in the saturator may, in dependence upon the nature of composition of the combustible gas added to the sample gas, be the same as or different from the liquid in chamber 19; in the specific example discussed, it may be water.

The gas mixture passing through these orifices 128, 129 form bubbles at the lower end of tube 26A which in rising through the tube are saturated with water vapor. The upper end of tube 27B is enlarged to form bulb 35, in which any large drops of water are allowed to fall back instead of passing through the ports 34 into the chamber immediately above bulb 35 in effect a continuation of tube 27B; preferably in this chamber is disposed a quantity of glass beads 33 (Fig. 1) or equivalent filter which trap any free moisture or mist which upon collection trickles back through ports 34 downwardly into and through bulb 35.

The level of liquid in the chamber defined by tubes 27B and 30 is maintained at the same level as liquid in chamber 19; in the particular system shown in Fig. 1 in which the liquids are of the same composition the pipe 31 connects to chamber 19 below the liquid levels; the space above the liquid level of the saturator 5 is, by connection 25 and pipe 23, in communication with the space above the liquid level of chamber 19.

For constant rate of flow of the sample-hydrogen mixture, the rate of bubbling through pipe 26A of the saturator is constant, the back pressure produced by liquid in the tube is constant, and the pressure drops, including those in the capillary tubes 20 and 21, are constant. There is therefore maintained that constancy of the ratio of hydrogen to sample gas required to ensure the measurement of change in thermal conductivity of the mixture shall be accurately indicative of the amount or percentage of oxygen in the sample gas.

In the particular arrangement shown, the capillary 20 is 7 inches long and of .025 inch inside diameter and capillary 21 is 3 inches long and of .012 inch inside diameter.

The water in the saturator 5 and the regulator device 19 may be supplied through pipe 31 by reservoir 27 and condensate from condenser 14, all interconnected as shown in Fig. 1; the connection from the condenser to the reservoir avoids back pressure otherwise possible because of collection of water in the gas line system. Reservoir 27 serves to maintain constant the levels of liquid in chambers 19, 5 and 16 by supplying liquid whenever the liquid level in chambers 19, 5 and 16 becomes too low by admitting air from atmosphere through openings 23a and 27a into chamber 27 closed at its top by stopper 27s, thereby permitting liquid to flow from 27 through 31 again to raise the liquid level in chambers 19, 5 and 16 to the level of opening 27a; in case the level of liquid in these chambers, becomes higher than that of reservoir outlet 27a, the excess escapes through pipe 31 and outlet 27a to waste outlet 23a until the level of liquid in chambers 19, 5 and 16 returns to the level of opening 27a.

By provision of the pressure-controlling arrangement described, or its equivalent, the rate of flow of gas to and through the furnace 8 is maintained constant. This is of importance because it is therefore possible to use a tube 12 of such reduced cross-sectional area that the velocity of gas through the combustion chamber is so high there is not sufficient time for occurrence of relatively slow and undesired gas reactions, such as the water gas reaction, which would cause appreciable errors.

We have found that in a measuring apparatus having a range from 0 to 10 percent oxygen in flue gas and with a gas flow of 150 cubic centimeters per minute, the tube 12 may have a diameter as small as 1/8" or as large as 1/4" if the heated portion is 4" long and is operated at temperatures between 650° C. and 1000° C. The velocity of the sample-hydrogen mixture through the combustion zone accordingly ranges from about .450 centimeters per minute to about 1800 centimeters per minute; which velocity serves to prevent reaction of either the oxygen or hydrogen with the other components of the sample-hydrogen mixture; aforesaid velocity is sufficient to prevent also aforesaid water gas reaction; furthermore aforesaid velocity is nevertheless not too high to interfere with or prevent complete combustion of the oxygen and hydrogen of the mixture passing through the combustion zone.

The filter 32 interposed in supply line 2 of the sample gas comprises a housing of Pyrex glass, or other suitable material, containing a filler of asbestos wool, or like filter material suited to remove ash, dust, soot, or other solid contaminant from the gas before it reaches the capillary tube 20. The stopper 32a of rubber or other suitable material is provided for convenient replacement of the charge of filter material.

All fixed parts of the saturator are preferably of "Pyrex" glass; the stopper 36 is provided to facilitate draining of the condenser 14 and saturator 5.

The condenser 14 is so designed that its heat capacity is or can be made substantially equal to the heat capacity of saturator 5. Consequently any small variations of temperature of the atmosphere within cabinet 10 have no appreciable effect because of substantial equality of the variations in water vapor content of gases US and CS leaving saturator 5 and condenser 14 respectively. Liquid for determining the thermal capacity of condenser 14 may be introduced into chamber 37 thereof through snout 40 normally closed by stopper 41. There is no passage connecting chamber 37 to any of the tubes 13, 16 or 15 within the condenser.

In the arrangement shown in Fig. 1, the water vapor concentration in the gas mixture before and after combustion is maintained constant by maintaining condenser 14 and tubes 7 and 13 at temperatures equal to or above the temperature of the saturator by their disposition within housing 10, whose temperature is maintained constant, as by thermostatic control, and suitably thermally insulated from the furnace cabinet 9. The thermal shields 38, 39 protect the tubes 7 and 13 from currents of relatively colder stratified air in the lower part of cabinet 9.

The combustion tube 12 of the furnace is surrounded by a pair of refractory supports or blocks in which are embedded the heating coil windings 42, 43 of Chromel, or other suitable resistance conductor, for maintaining the combustion tube at suitably high temperature, for example above 600° C. and preferably between 650° and 1000° C. The tube temperature may be measured by a thermo-couple 44 suitably fastened to the outside of tube 12 near its midpoint. The thermal insulation about the refractory block and within the metal outer casing 45 of the furnace preferably consists of molded Sil-O-Cel blocks.

To ensure the combustion reaction is confined to the furnace and does not extend into system components in chamber 10, there are provided in the gas lines 7 and 13, within chamber 9, the capillaries 46, 47 which, for example, may be about 1 inch long and of 0.6 millimeter internal diameter.

The cabinet 10 is thermally insulated, as by a lining of sheet asbestos or the like and its internal temperature maintained substantially constant at suitable magnitude, for example 120° C., by the electric heaters 86, 87, Fig. 2, the energization of either or both of which is controlled by thermostat 48. The thermometer 49 for indicating the internal cabinet temperature is visible through window 50, Figs. 7 and 8, and a side door 51. Window 50 is of safety glass and a side of the cabinet is provided with a heavy paper blow-out; these provisions avoid damage in event leakage of hydrogen causes a minor explosion inside of the cabinet 10.

For either pressure or vacuum sampling applications, a trap should be included in the exhaust line 23 and the exhaust line so disposed that condensed water drains to the trap or outlet and does not produce a variable back pressure. When the supply of sample gas S is about or below atmospheric pressure, the trap 52, Fig. 7, should extend at least about 40 inches below connection of exhaust line 23 thereto and the exhaust line is connected, preferably through a capillary tube 53, to a vacuum pump, aspirator, or the like.

When the supply of sample gas is sufficiently above atmospheric pressure, the trap 54, Fig. 8, need extend only about 6 inches below connection of exhaust line 23 thereto and its upper end directly, or through an extension of exhaust line 23, is open to atmosphere. In both cases, it is desirable to connect a trap 55 to the line 2 of sample gas to remove any liquid present in the gas stream before it enters cabinet 10.

Referring to Fig. 2, the heaters 42, 43 of the furnace and heaters 86, 87 for cabinet 10 may be energized from any suitable source of current, for example source E of 110 volt, 60 cycle current. The bridge network N including the thermal conductivity cells 6 and 16 and the other resistors O, may be energized from that same source E, through a suitable step-down transformer 56, about 10 to 1 ratio, or from any other suitable source of direct or alternating current.

In the particular system shown, the unbalance of the network N is measured by an alternating current potentiometer network P whose components may be disposed in housing H.

Between the conjugate points X and Y of network N are connected in series the fixed resistance 57 and the voltage-dividing resistance 58 whose contact 59 is manually adjustable to change the range of the measuring system. For use in boiler furnace installations, a full scale range of 0 to 10% oxygen is suitable; in other industrial installations, a range of 0 to 2% or 0 to 4% oxygen may be more desirable because of corresponding expansion of the scale of the associated indicating or recording apparatus.

The moving coil 60 of galvanometer G is normally connected between the contact 59 of the range-setting resistance 58 and the adjustable contact 61 of resistance 62 connected in shunt to the main potentiometer slidewire 63. Contact 61 is manually adjustable to correct for shift in "zero" of the measuring system due, for example, to variation in the percentage of oxygen present in the tank hydrogen used as a convenient source of supply. The usual tank hydrogen contains about 0.2% oxygen but the concentration may vary to such extent from that value that except for compensation by adjustment of resistance 62 the error in measurement of free oxygen in sample S would be intolerably large. With the arrangement shown, the total error due to all causes including temperature changes and line voltage variations is not more than about .5 percent of full scale.

To minimize the effect of line voltage variations, a voltage regulator 64 of any suitable type may be connected between the power line and the transformers 65, 66 which supply current to network P and to field winding 67 of the galvanometer G.

To measure the percentage of oxygen in the sample gas supplied to the apparatus in cabinet 10, the contact 68 is adjusted relative to the potentiometer slidewire 63, either manually, or preferably automatically as by mechanical relay mechanism such as shown in Squibb Patent No. 1,935,732, until there is null deflection of galvanometer G. The percentage of oxygen may then be read directly from a scale associated with the movable element 63 (or 68) of the potentiometer slidewire or recorded on a chart moved continuously with respect to a stylus or pen movable in unison with the adjustable element 63 (or 68) of the potentiometer.

During such measurement, the contacts 69, 70 of switch 71 are in their right-hand position to connect galvanometer G as above described and to complete the primary circuit of transformer 65.

When those contacts are thrown to their left-hand position, transformer 65 is de-energized and the movable coil of the galvanometer is transferred from connection with network N to connection with resistor 72 for check of the electrical and mechanical zero of the galvanometer. To check the zero and the range of the measuring apparatus, it is preferable to substitute alternately for the sample gas S (with switch 69 in right-hand position) two gas mixtures, one preferably of low oxygen content, whose oxygen contents have been determined with an Orsat apparatus. The zero of the system may be reset to compensate for any free oxygen, as an impurity, in the hydrogen supplied from a particular tank or reservoir.

In installations where speed of operation is of greater importance than high precision, saturator 5 may be replaced by a capillary tube or equivalent having the same resistance to flow as the saturator; if such substitution is made no readjustments are needed in the system. Alternatively, the saturator may be eliminated without such substitution of a capillary, and a compensation effected by readjustment of contact 59 on voltage divider 58.

The speed of response can be increased by substituting for cell 6, traversed by the uncombusted mixture, a sealed cell containing a reference gas, such as a hydrogen-sample gas mixture, or a fixed resistor having the same resistance as the cell-resistor. In the latter case, the temperature-compensating effect of the other two arrangements is absent, but this may be tolerated if the cabinet temperature is accurately regulated. In each of these cases, the measurement is of the change in thermal conductivity of the gas mixture due to removal of hydrogen by combustion; in the first case as above described, the reference standard of thermal conductivity is the uncombusted mixture itself.

Also in the interest of greater speed of response, the thermal-flow type of cell illustrated in Fig. 1 may be replaced by one of the direct-flow type in which the main gas stream itself sweeps over the cell resistor.

When in substitution for, or as a source of, hydrogen, the gas or vapor supplied to pipe 1 for mixture with the sample gas S is ammonia, the liquid in the flow-regulating system must be non-aqueous; it may be an oil which, unlike water, has insubstantial power of absorption of ammonia gas. In such modification, the saturator 5 is omitted and condenser 14 may be omitted. Cracking or dissociation of the ammonia is effected within the combustion chamber 12 and the hydrogen so released immediately combines with the oxygen of the mixture. The diagram below indicates the reactions; the symbols $a$, $b$, $c$ and R have the same significance as in the preceding diagram.

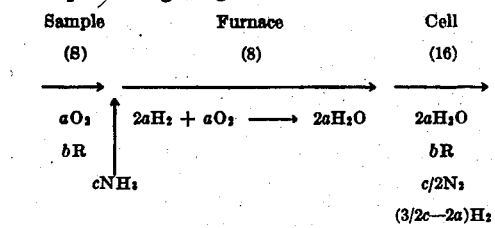

(3c must be greater than 4a.)

Again it appears the principal effect measured is the change in thermal conductivity due to disappearance of "$2a$" volumes of hydrogen gas from the combusted mixture.

When the sample gas includes sulfur, free or in combination, it is not practical to omit the saturator 5 and condenser 14, for, unless the gas mixture is saturated, a film of sulfur forms on the insides of the tubes and cells traversed by the gas-mixture. Notwithstanding need for saturation of the mixture with water, ammonia may nevertheless be used as the source of hydrogen provided it is cracked or dissociated suitably in advance of the saturator 5.

In the particular arrangement shown in Fig. 1A, the precracking of the ammonia is effected by the same furnace 8 used for effecting combustion of the hydrogen component of the ammonia with the oxygen of the gas sample; precracking may of course be effected within a furnace separate and distinct from furnace 8. Inasmuch as in Fig. 1A the cracking of the ammonia is effected in advance of chamber 19 as well, the liquid in chamber 19 may be water, or other liquid in which uncracked ammonia is highly soluble, because neither the hydrogen nor the nitrogen resulting from dissociation of the ammonia is to appreciable extent soluble therein. In general, any liquid may be used for the regulator 19 unless it dissolves or reacts with one or both of the combustible and sample gases.

Use of ammonia instead of tank hydrogen is preferable because it is far less explosive, its distinctive odor immediately warns of leakage, and it is a relatively cheaper and less bulky source of hydrogen.

The reactions involved when the ammonia is pre-cracked, as in Fig. 1A, appear in the following diagram in which the symbols $a$, $b$, $c$ and R have the same significance as in the preceding diagrams.

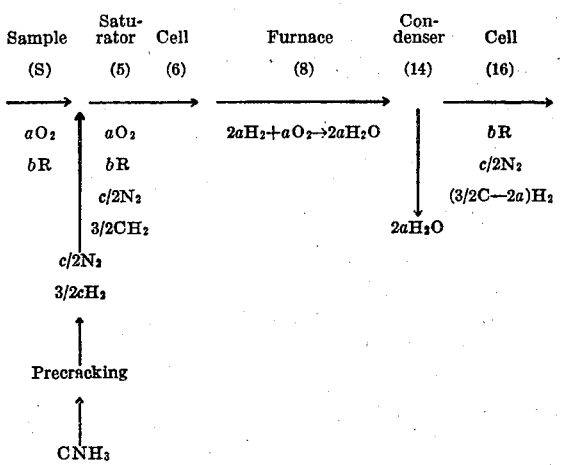

From this diagram it again appears the principal effect measured is the disappearance of "$2a$" volumes of hydrogen gas which causes marked change in the thermal conductivity of the mixture definitely related to the percentage of oxygen in the original sample.

For brevity in the appended claims, it shall be understood the term "gas" shall include a gas, a gas mixture, a vapor, mixture or vapors or a mixture of one or more gases and vapor, and the term "hydrogen" comprehends equivalent gases and vapors which are combustible by or combine with the oxygen or other selected component of the sample gas.

We disclaim use or presence in the reaction or combustion chamber 12 of an electric or other heater, a protecting tube of nickel or other metal, a metallic mirror, or any other metallic or catalytic substance.

What we claim is:

1. Apparatus for analyzing a gas for its oxygen content comprising a refractory externally heated non-metallic combustion chamber, a gas sample conduit and a conduit for a combustible gas uniting and delivering into a second chamber at a low level therein, said second chamber being arranged to contain water to a higher level through which the gas ascends, a thermal conductivity determination cell, a conduit connecting the upper portion of said second chamber with said cell, electrical means for measuring an electrical effect varying with the thermal conductivity of the gas passing through said cell, a conduit connecting said cell and said combustion chamber, a condenser, a conduit connecting said combustion chamber with said condenser, a second conductivity cell, a conduit connecting said condenser with said second cell, electrical means for measuring an electrical effect varying with the thermal conductivity of the gas passing through said second cell, and means arranged to compare the magnitudes of said electrical effects.

2. Apparatus for analyzing a gas for its oxygen content comprising capillary tubes for respectively conducting a gas sample and a combustible gas into mixture with each other, said capillary tubes uniting into a single conduit, a saturator to which said single conduit connects and adapted to contain water for saturation of said mixture, a thermal conductivity determination cell, a refractory externally heated non-metallic combustion chamber, a conduit connecting said saturator to said cell and a conduit connecting said cell with said combustion chamber, a second thermal conductivity cell, a condenser, a conduit connecting the discharge of said combustion chamber with said condenser, a conduit connecting said condenser with said second cell, a pressure-regulating system comprising a closed chamber adapted to contain liquid, bleeder connections from the upstream sides of aforesaid capillary tubes to points below the normal level of the liquid in said closed chamber, a back pressure connection between said saturator and said closed chamber above the normal liquid levels therein, and conduits respectively connecting the space above the liquid in said closed chamber to the discharge of said second-named conductivity cell and to waste.

3. In the art of analyzing a mixture of oxygen with one or more other gases such as carbon monoxide, carbon dioxide, sulphur dioxide or methane, a method which comprises introducing hydrogen into the mixture, saturating the resultant mixture with water, passing the saturated resultant mixture through a refractory externally heated non-metallic combustion chamber and thereby effecting combustion of hydrogen of said resultant mixture, effecting saturation of the combusted mixture with water, and measuring the changes in the thermal conductivities of the saturated mixture before and after passage through said combustion chamber.

4. A method of analyzing a gas mixture comprising oxygen and one or more other gases, such as carbon monoxide, carbon dioxide, sulphur dioxide or methane, which comprises mixing an excess of combustible gas with a sample of aforesaid mixture, passing the resultant mixture of sample gas and added combustible gas through a non-metallic combustion chamber, raising the mixture, while traversing said combustion chamber, by heat generated externally thereof, to a temperature within a range from about 650° C. to about 1000° C. to effect selective combustion of the oxygen of the sample gas mixture with the added combustible gas, and measuring the change in the thermal conductivity of the gases prior and subsequent to aforesaid selective combustion.

5. A method of analyzing a gas mixture comprising oxygen and one or more other gases, such as carbon monoxide, carbon dioxide, sulphur dioxide or methane, which comprises mixing a combustible gas with a sample of the gas mixture, subjecting the resultant mixture, while traversing a non-metallic externally heated combustion chamber at a velocity of from about 450 to about 1800 centimeters per minute, to a temperature within the range from about 650° C. to about 1000° C., and measuring the change in the thermal conductivity of the gas mixture on entering and discharge from said combustion chamber.

6. A method of analyzing a gas mixture comprising oxygen and one or more other gases, such as carbon monoxide, carbon dioxide, sulphur dioxide or methane, which comprises mixing a combustible gas with a sample of the aforesaid gas mixture, saturating the resultant mixture with water, subjecting the saturated mixture, while traversing a non-metallic externally heated combustion chamber, at a velocity of from about 450 to about 1800 centimeters per minute, to a temperature within the range from about 650° C. to about 1000° C., saturating the gas mixture discharged from said combustion chamber with water, and measuring the change in thermal conductivities of the saturated gas mixture before entry into and after discharge from said combustion chamber.

7. A method of determining the oxygen content of a gas mixture comprising one or more other gases, such as carbon monoxide, carbon dioxide, sulphur dioxide or methane, which comprises mixing with a sample of the gas mixture a gas to be combusted by the oxygen of the sample, saturating the resultant mixture with water, subjecting the saturated mixture, while traversing an externally heated non-metallic combustion chamber, at a velocity of from about 450 to about 1800 centimeters per minute, to a temperature within the range from about 650° C. to about 1000° C., causing the mixture discharged from said combustion chamber to be saturated with but devoid of excess water, and measuring the change in thermal conductivities of the saturated mixtures before entering and after discharge from said combustion chamber.

GEORGE A. PERLEY.
JAMES B. GODSHALK.

REFERENCES CITED

The following references are of record in the file of this patent:

UNITED STATES PATENTS

| Number | Name | Date |
| --- | --- | --- |
| 1,321,064 | Lamb et al. | Nov. 4, 1919 |
| 1,382,072 | Kinkl | June 21, 1921 |
| 1,578,666 | Katz | Mar. 30, 1926 |
| 1,681,047 | Porter | Aug. 14, 1928 |
| 1,827,930 | Bissell | Oct. 20, 1931 |
| 1,900,884 | Lusby | Mar. 7, 1933 |
| 2,005,036 | Howe | June 18, 1935 |
| 2,042,646 | Willenborg | June 2, 1936 |
| 2,083,520 | Miller | June 8, 1937 |
| 2,168,236 | Pick | Aug. 1, 1939 |
| 2,260,821 | Bendy | Oct. 28, 1941 |
| 2,273,981 | Morgan et al. | Feb. 24, 1942 |
| 2,322,159 | Saxer et al. | June 15, 1943 |

FOREIGN PATENTS

| Number | Country | Date |
| --- | --- | --- |
| 394,292 | Great Britain | June 22, 1933 |
| 343,874 | Great Britain | Feb. 23, 1931 |